No. 884,357. PATENTED APR. 14, 1908.
C. T. H. BOND.
FEEDER GOVERNOR.
APPLICATION FILED JULY 5, 1907.
2 SHEETS—SHEET 2.
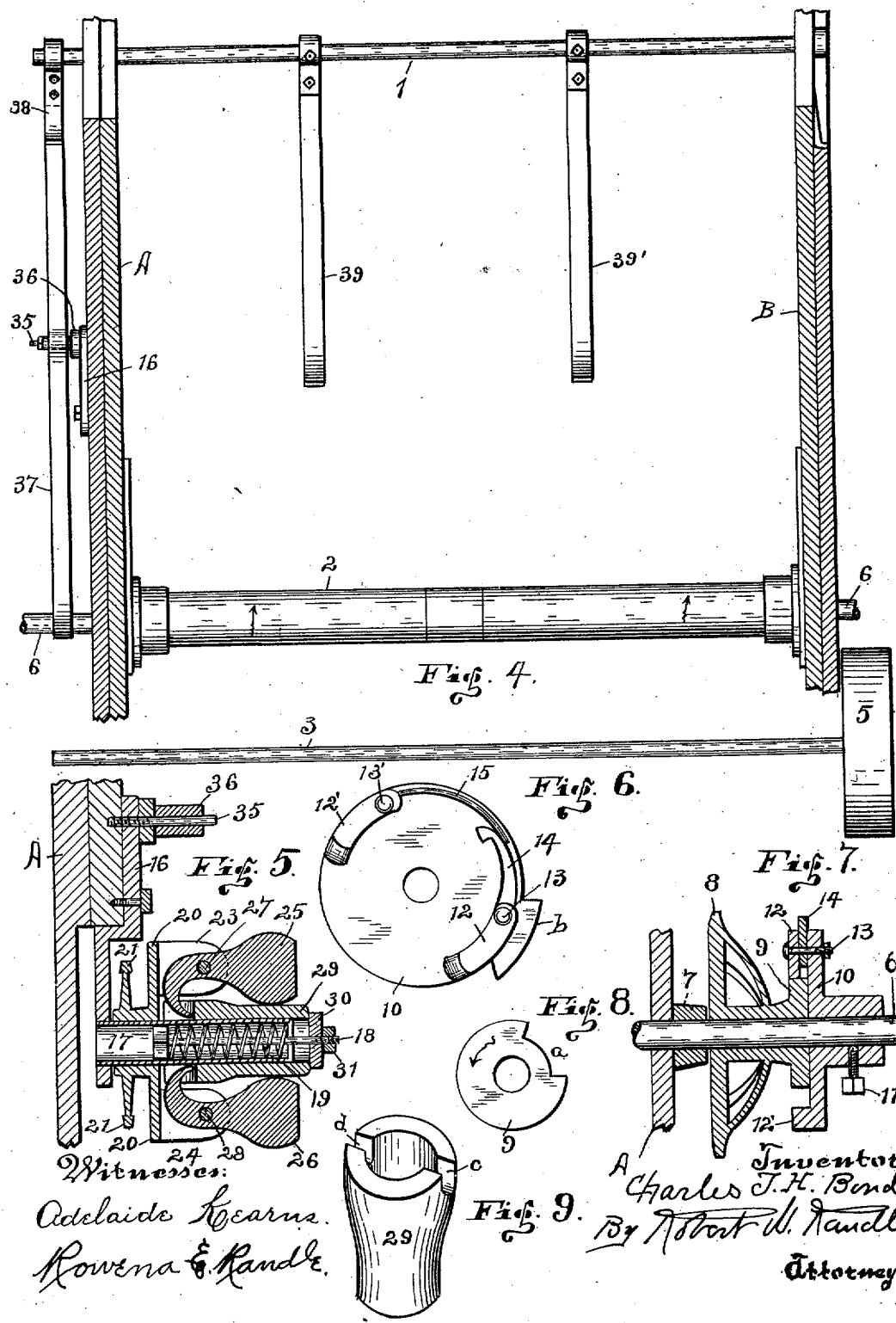

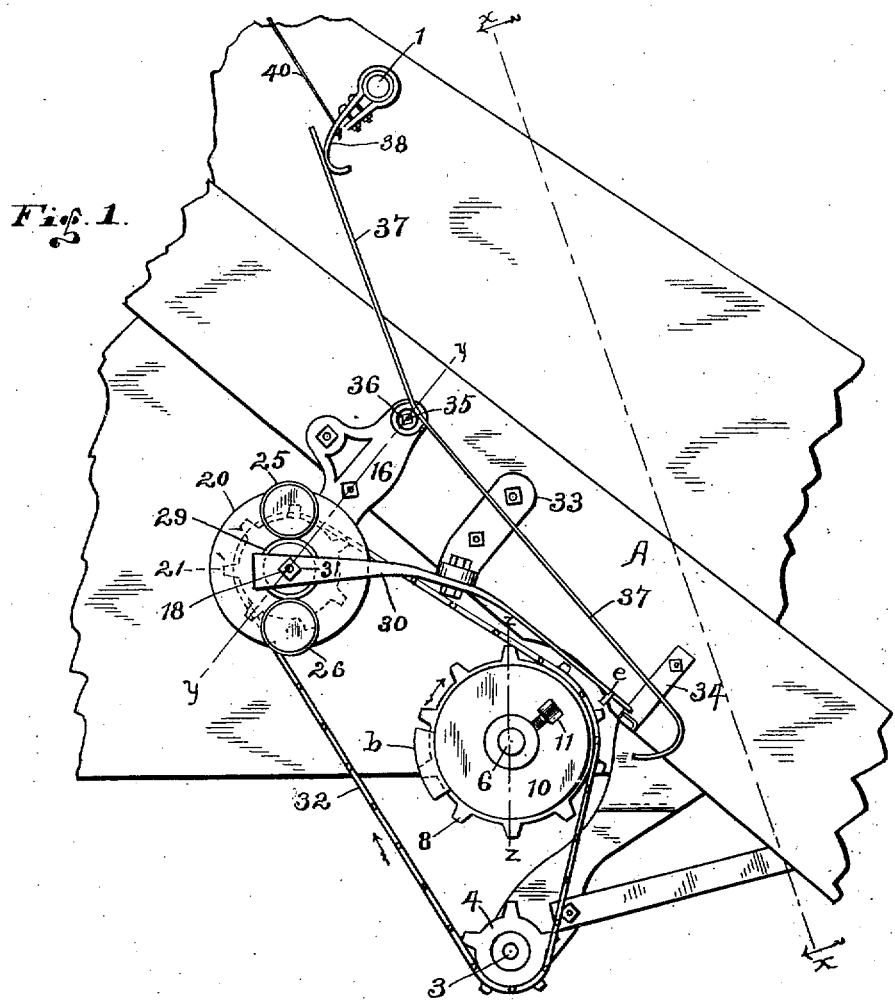

UNITED STATES PATENT OFFICE.

CHARLES T. H. BOND, OF RICHMOND, INDIANA.

FEEDER-GOVERNOR.

No. 884,357.

Specification of Letters Patent.

Patented April 14, 1908.

Application filed July 5, 1907. Serial No. 382,153.

*To all whom it may concern:*

Be it known that I, CHARLES T. H. BOND, a citizen of the United States, residing in the city of Richmond, in the county of Wayne and State of Indiana, have invented certain new and useful Improvements on Feeder-Governors, of which the following is a full, clear, and accurate specification, being such as will enable others skilled in the art to which the invention relates to make and use the same with absolute exactitude.

The object of my present invention, broadly speaking, is the provision of automatic governors and controllers for self-feeders in connection with threshing machines or the like, in which the mechanical parts are reduced to the minimum while the advantages which innure attain the maximum of mechanical efficiency.

A further object is to provide a feed-governor and a controller for feeders which will be simple in arrangement, strong and durable in construction, positive in action, automatic in operation, and which can be manufactured and sold at a comparatively low price.

More specifically stated the objects are to provide a construction for automatically controlling the delivery of grain to the band-cutter and thresher cylinder of a threshing machine whereby if the speed of the thresher is reduced beyond a certain point, or if the delivery of the grain is too rapid, the feeder will be stopped and thereby allowing the thresher to regain the required minimum speed after which the feeder will be automatically started.

The particular object of the invention is to provide means, in connection with a feeder and a thresher, whereby the feeder will not begin to operate to deliver grain to the thresher until the thresher has attained a predetermined rate of speed; and also to provide means whereby if the delivery of grain to the thresher shall become too great, passing a predetermined amount, that the delivery of the grain will be automatically discontinued until the thresher has disposed of the surplus; and finally, to provide means whereby the operation of the feeder may be discontinued at the will of the operator, regardless of the rate of speed or the amount of grain passing into the thresher.

Other objects and particular advantages of my invention will appear in the course of the ensuing specification and the points which are new will be correlated in the appended claims.

The preferred manner for the construction of my invention is shown most clearly in the accompanying drawings, in which—

Figure 1 is a side elevation of a portion of a self-feeder showing my invention in normal operative position. Fig. 2 is a plan view of the major portion of my mechanism in normal operative position, showing the operation of the feeder as out of gear. Fig. 3 is a plan view similar to Fig. 2 except that the mechanism is moved to show the feeder in gear. Fig. 4 is a cross sectional elevation of a self-feeder as taken on the line X—X of Fig. 1. Fig. 5 is a sectional view of my mechanism, as taken on the line Y—Y of Fig. 1. Fig. 6 is an inside-face view of the clutch-disk. Fig. 7 is a detail sectional view, as taken on the line z—z of Fig. 1. Fig. 8 is a face view of the cam operable in connection with the face of the clutch-disk shown in Fig. 6. And Fig. 9 is a detail perspective view of the regulator thimble.

Similar indices denote and refer to like parts throughout the several views of the drawings.

The feeder which my invention is intended to control is adapted to be attached on the feed-end of a threshing machine, and the letters A and B refer to the two sides of the feeder, which sides correspond to the two sides of the threshing machine to which the feeder is attached. In order to show the operation and construction of my invention it is necessary to refer, first, to three shafts which extend transversely through the feeder, as shown in Fig. 4, and are described as follows: Extending across near the upper edge of the feeder is the regulator shaft 1. The numeral 6 denotes the carrier, or feeder, shaft which extends out some distance beyond the side A for the purposes presently appearing. And the numeral 3 denotes the drive-shaft which transmits the power to my invention and for other purposes not necessary to a description in connection with this invention.

The numeral 2 denotes the carrier over which operates an endless belt or apron for delivering the grain to the thresher. Said carrier extends between the sides A and B and it is disposed around the shaft 6. Secured to one end of the shaft 3, outside the face of the side A, is the small sprocket-wheel 4; and secured on the opposite end of the shaft 3, outside the face of the side B, is the pulley or belt-wheel 5.

Connected with the outer extending end of the shaft 6 is a sprocket and a clutch mechanism which I will now describe: As will be observed in Fig. 7 the shaft 6 operates through a boxing 7, and the sprocket-wheel 8 is revolubly mounted on the shaft 6 and is operable against the boxing 7 as shown.

The numeral 9 designates a disk cam, a face view of which is shown in Fig. 8, which has an inwardly projecting flange integral with outwardly projecting flange of the sprocket 8, thereby forming the cam 9 integral with the sprocket 8, both being freely revoluble on the shaft 6.

The numeral 10 denotes the disk of the clutch which is mounted around the shaft 6, having an outwardly extending flange provided with a set-screw 11 by which the disk 10 may be rigidly secured on the shaft 6 with its face contacting with the face of the cam 9 as shown in Fig. 7. Integral with the face of the disk 10 are two hangers 12 and 12' which are oppositely disposed and are located on opposite sides of the face of the disk. Bolts 13 and 13' are provided to project in an axial direction through the free ends of the respective hangers and through the disk as shown, for the purposes presently set forth.

The numeral 14 denotes a dog or pawl mounted on the face of the disk 10 near the periphery and corresponding with the curvature thereof, which is pivoted on the bolt 13 as shown in Figs. 6 and 7. The point of the dog 14 is formed as a hook, which hook is adapted to engage one of the shoulders formed by the indentation $a$ in the cam 9. An elongated lug or stop $b$ is formed on the outer edge of the dog 14 and it projects out beyond the periphery of the disk 10, as shown in Fig. 6, for the purpose presently appearing. A spring 15 is secured at one end to the bolt 13' with its free end adapted to normally retain the hook-point of the dog in the indentation $a$. It should be noticed that when the dog 14 and the spring are arranged as shown that the clutch is then arranged right-handed,—while if the dog 14 be turned over and pivoted on the bolt 13', and the spring 15 be secured to the bolt 13, then the clutch will operate left-handed.

The numeral 16 denotes a bracket secured to the side A and carrying on its lower end portion the outwardly extending barrel-shaft 17 which has a closed outer end, through which passes the shank of the bolt 18, the head of said bolt being slidable in the barrel, and a helical spring 19 is convoluted about the bolt 18 the same being wholly located in said barrel with one end seated against the head of the bolt 18 and the other end seated against the closed end of the barrel, all as shown in Fig. 5. Mounted revolubly on the shaft 17 is a disk 20 having an inwardly extending flange around which rises the sprocket-wheel 21 integral therewith. Extending outward from the face of the disk 20 are two pairs of hangers 23 and 24 between each pair of which is pivoted the shank of the respective weighted levers with the central portions of the levers flattened to fit between the pairs of hangers as shown in Fig. 2.

The numerals 27 and 28 denote the respective bolts by which said balls are pivoted. The inner ends of the shanks of said balls are curved towards each other and then forward, as in Fig. 5, with their points approaching near the shaft 17 as shown.

The numeral 29 denotes a thimble adapted to fit around the shaft 17, and of the same length, and having notches $c$ and $d$ formed in its inner end, as shown in Fig. 9 to fit loosely over said shank portions of the balls 25 and 26, as in Fig. 5, whereby the inner end of the thimble may contact with the face of the disk 20.

The numeral 30 denotes an arm secured at its forward end on the outer extending portion of the bolt 18, by the nut 31, contacting with the outer end of the thimble 29, and being adapted to contact with the outer end of the shaft 17, which arm will be further explained. Threaded on the outer extending portion of the bolt 18 and contacting with the arm 30 is the nut 31 by which the tension of the spring 19 and the length of the bolt 18 may be adjusted.

Referring now, more particularly, to Fig. 1 the numeral 32 denotes a sprocket-chain which is disposed over the three sprocket wheels 4, 8 and 21, whereby the operation of the former will operate the other two synchronously therewith, and normally operating in the direction indicated by the arrow relating thereto.

The numeral 33 denotes a bracket secured to the side A, as shown, located midway between and somewhat above the center of the sprockets 8 and 21. The arm 30 above referred to is pivoted at its central portion to the hanger extending out from said bracket 33, for the horizontal movement of said arm as indicated. The forward end of said arm being connected to the bolt 18 as above set forth, from which it extends rearward at an angle, with its rear horizontal portion normally located over the disk 10. At its rear end the said arm is split and a portion thereof is turned down forming the hook $e$, the complementary portion extending back and resting slidably on the outwardly extending portion of the bracket 34, as shown in Figs. 1 and 2. The said hook $e$ is adapted, normally, to be in engagement with the lug $b$ whereby it will hold the dog 14, against the resiliency of the spring 15, and retaining it out of engagement from the cam 9, thereby allowing the cam 9 and the sprocket 8 to revolve while the clutch and the shaft 6 remain relatively stationary.

The operation of the feeder is also controlled by a mechanism auxiliary to that before set forth herein and governed by the quantity of material carried by the conveyer, which I will now describe: Extending out from the upper portion of the bracket 16 is a stud 35 around which is mounted a collar 36. The numeral 37 designates an arm, shown in Fig. 1, which is pivotedly mounted a little forward of its center on the collar 36. On the rear end of said arm is formed a hook which is so positioned as to be immediately over the lug $b$ and which is normally adapted to engage said lug to hold the dog 14 out of engagement with the cam 9 as previously stated with reference to the hook $e$. Adjustably secured on the outer projecting end of the shaft 1 is a wiper-cam or hook 38 adapted to engage or swipe the upper surface of the arm 37 as shown in Fig. 1 and it is adapted to press on said arm to hold the hook of said arm away from engagement with the lug $b$ as shown. Rigidly secured to the shaft 1 and hanging down inside the throat of the feeder is a plurality of regulating arms, 39 and 39', and of course the shaft 1 is loosely mounted in its bearings whereby said arms may swing loosely, but normally hanging pendent. The wiper-cam 38 should be so positioned on the shaft 1 that said arms 39 and 39' will when hanging down cause the wiper-cam to press down on the arm 37 whereby the hook of the latter will not be in engagement with the lug $b$. It is apparent that the cam 38 may be so adjusted on the shaft 1 that when the arms 39—39' are swung forward a predetermined distance the cam 38 will turn off the end of the arm 37 and release it, thereby allowing the hook of the arm 37 to engage the lug $b$ as above stated.

The numeral 40 denotes a trip-line which may be attached to the cam 38 and lead to some convenient point where it may be pulled manually, in order to stop the feed by holding the dog 14 in engagement with the cam 9, operating substantially, otherwise, as above set forth.

Operation: If now the threshing machinery be operating continuously, and a belt be connected therefrom over the pulley 5, the shaft 3 and the sprocket 4 will operate at all times the threshing machinery is operating, as will also the sprockets 8 and 21, carried by the chain 32, but it will be noticed that the sprocket 8 and the cam 9 will revolve idly on the shaft 6, by reason of the dog 14 being held out of engagement with the cam 9. After a predetermined speed has been attained the weighted ends of the levers 25 and 26 will by their gyration spread apart thereby sliding the thimble 29 outward endwise against the resiliency of the spring 19, which of course will move outward the front end of the arm 30 thereby moving the rear end of said arm 30 inward causing the hook of the arm 30 to release the dog 14 and allowing the dog to engage in the indentation $a$ of the cam 9, thereby coupling the disk 10 to the cam 9 and causing said disk 10 and the shaft 6 to rotate with the sprocket 8. The revolutions of the shaft 6 will of course eventuate in operating the conveyer 2 and cause the feeder to deliver the grain, which may be deposited on the conveyer, to the threshing machinery, and it will continue thus to operate until the speed has decreased sufficient to allow the governor to return the arm 30 to its normal position, which of course will cause the dog 14 to become disengaged from the cam 9 thereby stopping the feeder until the speed has again reached its predetermined minimum.

If at any time when the feeder is operating, and although the speed may be above the minimum it should happen that an abnormal quantity of grain should attempt to pass over the carrier, then in that event the grain will engage the arms 39—39' thereby turning them forward and by that releasing the arm 37 and allowing the hook on the arm 37 to disengage the dog 14 from the cam 9 and thus stopping the feeder until the said arms 39—39' are allowed to hang pendent, which of course will cause the arm 37 to release the dog 14 and thereby allow the feeder to resume operation. I desire that it be understood that various changes and modifications may be made in the details and the arrangement of the several parts of my invention without sacrificing any of the principles or advantages thereof which are new and useful and which involve invention.

Having now fully shown and described my invention and the best means for its construction to me known at this time, what I claim and desire to secure by Letters Patent of the United States, is—

1. In a governor for threshing machine feeders, the combination of a conveyer, a conveyer shaft, means for actuating the conveyer, a clutch device applied to said shaft and consisting of a disk secured thereto, a dog pivoted to said disk at a side thereof and formed at one end with a hook and at the other with an outwardly projecting lug, a drive sprocket mounted for free rotation on the conveyer shaft and having a cam arranged adjacent to the disk aforesaid, a spring applied to the disk and bearing against the hook end of the dog to normally hold the latter in interlocking engagement with the cam and cause simultaneous rotation of the sprocket and conveyer shaft, a shifting lever arranged to engage the lug of the dog to hold the dog out of engagement with the cam, and means for actuating the lever to throw the same into and out of engagement with the dog.

2. In a governor for threshing machine feeders, the combination of a conveyer, a conveyer shaft, means for actuating the conveyer, a clutch device applied to said shaft and consisting of a disk secured thereto, a dog pivoted to said disk at a side thereof and formed at one end with a hook and at the other with an outwardly projecting lug, a drive sprocket mounted for free rotation on the conveyer shaft and having a cam arranged adjacent to the disk aforesaid, a spring applied to the disk and bearing against the hook end of the dog to normally hold the latter in interlocking engagement with the cam and cause simultaneous rotation of the sprocket and conveyer shaft, a shifting lever arranged to engage the lug of the dog to hold the dog out of engagement with the cam, a supporting bracket, a hollow shaft extending therefrom, a sprocket 27 mounted on said shaft and connected for movement with the first mentioned sprocket, weighted levers pivotally attached to the sprocket 27, a sleeve mounted on the hollow shaft slidably longitudinally thereof and engaged at one end by adjacent ends of the weighted levers, a spring in the hollow shaft and a bolt connecting said spring with the shifting lever and holding the latter against the sleeve, whereby movement of the sleeve by the centrifugal action of the weighted levers will cause engagement and disengagement of the shifting lever with regard to the dog of the clutch.

In testimony whereof I have hereunto signed my name to this specification in the presence of two subscribing witnesses.

CHARLES T. H. BOND.

Witnesses:
ROWENA E. RANDLE,
R. W. RANDLE.